United States Patent [19]

Leonard et al.

[11] Patent Number: 4,893,924
[45] Date of Patent: Jan. 16, 1990

[54] METHOD OF REMOTELY DETECTING SUBMARINES USING A LASER

[75] Inventors: Donald A. Leonard, Cupertino; Harold E. Sweeney, Menlo Park, both of Calif.

[73] Assignee: GTE Government Systems Corporation, Stamford, Conn.

[21] Appl. No.: 222,598

[22] Filed: Jul. 20, 1988

Related U.S. Application Data

[63] Continuation-in-part of Ser. No. 64,375, Jun. 22, 1987, Pat. No. 4,867,558.

[51] Int. Cl.⁴ ................................................ G01J 5/00
[52] U.S. Cl. ..................................... 356/43; 356/349; 374/123; 374/136; 374/137
[58] Field of Search .................... 356/43, 349; 73/655; 374/123, 136, 137

[56] References Cited

U.S. PATENT DOCUMENTS

| | | | |
|---|---|---|---|
| 4,195,931 | 4/1980 | Hara | 356/352 |
| 4,429,994 | 2/1984 | Guagliardo et al. | 356/352 |
| 4,767,219 | 8/1988 | Biddy | 356/301 |

Primary Examiner—Richard A. Rosenberger
Attorney, Agent, or Firm—Douglas M. Gilbert

[57] ABSTRACT

Subsurface waves in an ocean are created by the turbulence in a submarine's wake. These waves can be remotely detected by a search submarine by monitoring subsurface water temperatures using a laser. A pulsed laser beam is directed into the water to at least the depth of the thermocline and an analysis is made of the resultant Brillouin and Rayleigh backscatter components. Wavelength shifted Brillouin scatter is mixed with the unshifted Rayleigh scatter in a self-heterodyne manner for each volume element of illuminated water, and the frequency of the heterodyne signal is measured and converted into equivalent temperature values. This produces the desired temperature-depth profile of the water enabling detection of the first submarine by tracking the internal waves at or near the ocean thermocline.

23 Claims, 4 Drawing Sheets

METHOD OF REMOTELY DETECTING SUBMARINES USING A LASER

RELATED APPLICATION

This application is a Continuation-in-part of Ser. No. 064,375, filed June 22, 1987, now U.S. Pat. No 4,867,558. This application is also related to copending application Ser. No. 064,371, filed June 22, 1987, and entitled "APPARATUS FOR AND METHOD OF REMOTELY SENSING SUB-SURFACE WATER TEMPERATURES."

BACKGROUND OF THE INVENTION

1. Field of the Invention

The present invention relates to anti-submarine warfare (ASW) technologies and more particularly to a non-acoustic technique for remotely sensing the presence of submerged submarines from another submarine.

2. Description of the Prior Art

The detection and localization of submerged submarines has traditionally been dependent on passive acoustic techniques and/or magnetic anomaly detection. A major disadvantage of acoustic techniques is the loss of detection capability with advances in the development of noiseless or "silent" submarines. Another disadvantage is the cost and time required to install and maintain large numbers of submerged acoustic sensing devices over wide areas of the ocean in order to achieve the objective.

A submarine detection technique that avoids this disadvantage uses the internal waves created by a moving submarine as the sensed parameter. Internal waves are subsurface waves found between layers of water of different density or within ocean layers where vertical density gradients exist. [see "The Encyclopedia of Oceanography," Vol. I, Rhodes Fairbridge Edition, pages 402-408 (Reinhold Publishing Corp., New York, 1966)]. One way to measure such internal waves is to construct a profile of ocean water temperatures as a function of depth. A technique employed in the past for measuring such profiles involves the use of many temperature sensing elements (thermistors) spaced on a cable and towed by a ship. This is costly, time consuming and generally unsuited to high spatial and temporal resolution coverage of large ocean areas.

This invention is directed to submarine detection by the measurement of sub-surface ocean temperatures while avoiding the foregoing disadvantages.

A general object of the invention is the provision of a method of sub-surface submarine detection by remotely and rapidly measuring ocean temperature profiles from a second search submarine.

Another object is the provision of a method of sub-surface submarine tracking by remotely measuring ocean temperature profiles without the need for a precision interferometer.

A further object is the provision of such a method that permits submarine detection long after the vessel has passed the search area.

SUMMARY OF THE INVENTION

These and other objects of the invention are achieved with a remote temperature sensing laser device carried by an attack/search submarine. The remote temperature sensing device uses a pulsed laser to illuminate an area of interest which includes the thermocline region. Part of the temperature sensing device is an optical receiver which picks up the laser backscatter and uses the "self-heterodyne" of the wavelength shifted Brillouin scatter with the unshifted Rayleigh scatter. The "self-heterodyne" action allows mixing of these signals from each volume element of the illuminated water column independently by measuring the frequency of the heterodyne signal. Since this frequency is directly related to the water temperature and since time is directly proportional to depth, the resultant time-temperature pattern is equivalent to a temperature-depth profile. Submarine-created internal waves affect this profile so as to provide a long-persisting indication of movement of o another submerged vessel.

BRIEF DESCRIPTION OF THE DRAWINGS

For a better understanding of the invention as well as other objects and further features thereof, reference is made to the following description which is to be read in conjunction with the accompanying drawings wherein.

It should be noted that the same reference numerals identify identical components in each of the figures.

DESCRIPTION OF PREFERRED EMBODIMENT

Figure 1:
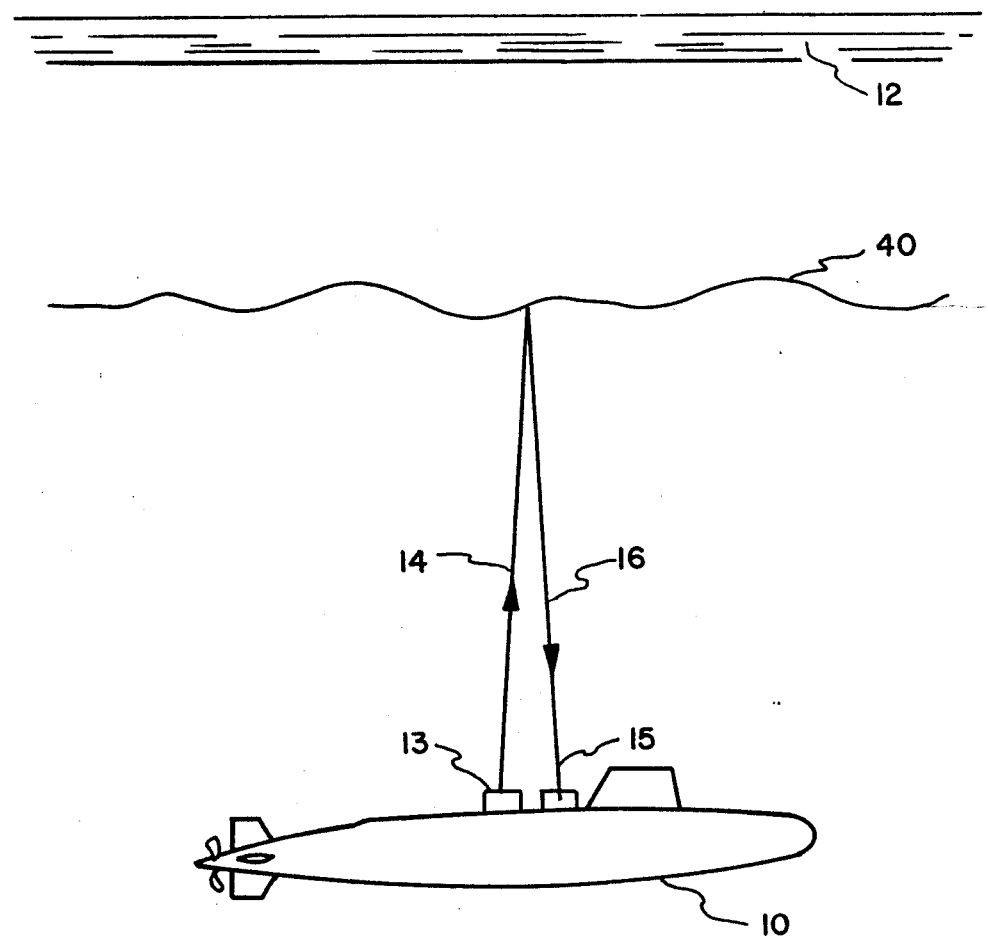
FIG. 1 is a schematic view of a submerged search submarine engaged in the practice of the invention.

For a better understanding of the subject invention, reference is made to the following description and appended claims in conjunction with the above-described drawings. Referring now to the drawings, FIG. 1 depicts a submerged submarine 10 in search of a second submarine (not shown) in a body of water 12 such as an ocean. The submarine 10 carries a laser transmitter 13 for producing a laser beam 14 directed into the water and a receiver 15 for receiving a return (backscatter) signal 16 from the water. Transmitter 13 generates a pulsed output beam 14 having a wavelength selected to penetrate the water 12, and return signal 16 contains Brillouin and Rayleigh backscatter components. In accordance with this invention, receiver 15 processes the Brillouin and Rayleigh signals to produce data indicative of the temperature at various depths to provide temperature-depth information. When the search submarine moves some distance between pulses, a three-dimensional map of the temperature in the medium may be accumulated and recorded for analysis purposes. To increase coverage of the mapped area, as opposed to taking a single "slice" out of the ocean, beam 14 may be traversed in a plane orthogonal to the direction of travel of the search submarine. The scanning angle of the beam from directly above or below the search vessel should be kept relative small and in most cases $< \pm 30°$. When scanning at any angle, the different distances (times) must be factored into the return backscatter signal for proper depth analysis.

In the preferred embodiment much of laser transmitter 13 and receiver 15 is housed outside of the submarine hull to avoid the necessity of an optical window being installed in the hull. The electrical connections are made through an interconnect cable (not shown) placed through the submarine hull. Although FIG. 1 depicts the search submarine being below the thermocline region 40, submarine 10 may operate above the thermocline and direct the beam in a downwardly direction to at least the thermocline region.

Figure 2:
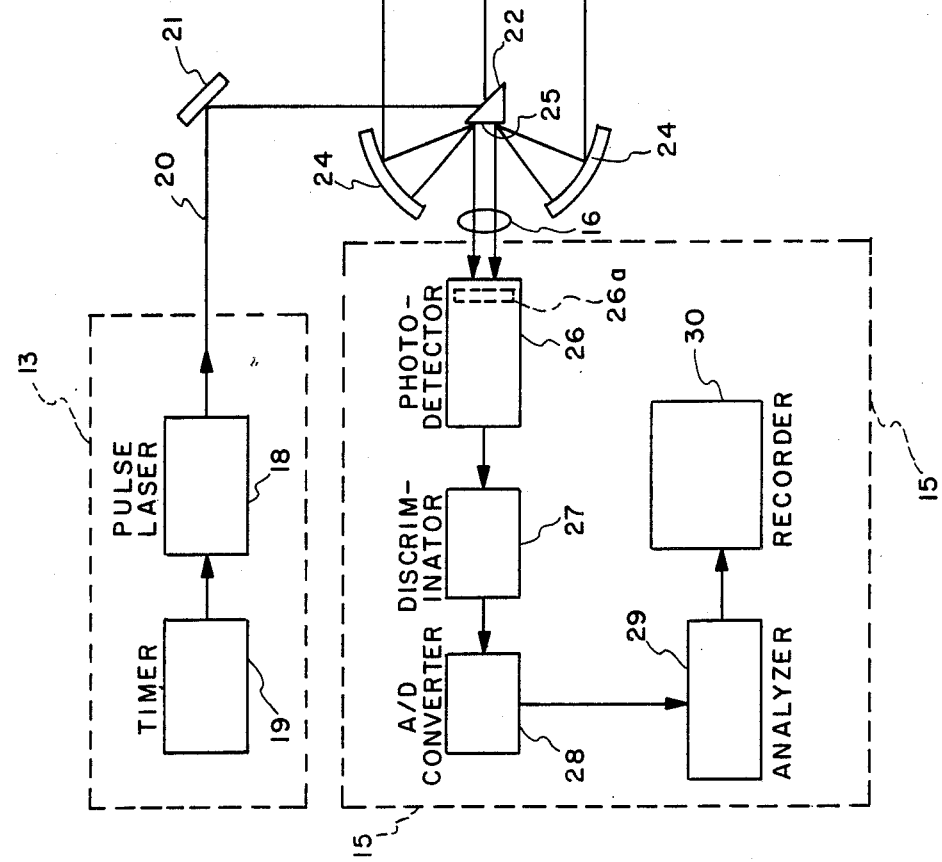
FIG. 2 is a schematic block diagram of the transmitter and receiver components comprising the apparatus embodying the invention.

A more detailed block diagram of transmitter 13 and receiver 15 along with associated optics is shown in FIG. 2. Transmitter 13 comprises a laser 18 controlled by a timer 19 to produce output laser pulses 20. The output of laser 18 preferably is in the blue-green portion of the spectrum (4500 to 5500 Å in wavelength) and has a typical pulse repetition frequency of 100 Hz, and a pulse width sufficient to provide the desired depth resolution. A laser useful for this purpose is a frequency doubled Nd:YAG at a wavelength of 5300 Å. The interrogating pulses are directed by mirrors 21, 22 and 23 to the thermocline target area 40 above the search submarine 10. If the search submarine were above rather than as shown in FIG. 1, below the thermocline area 40, the focusing mirrors would direct the output 20 down rather then up to detect the temperature of the water.

Return signal 16 containing Brillouin and Rayleigh backscatter components resulting from the interaction of the laser pulses with the sea water is a continuous signal which is in contrast to a single target return signal as in radar. The return signature 16 is directed by mirrors 23, 24 and 25, to the receiver 15 comprising photodetector 26 having a cathode 26a, discriminator 27, analog to digital converter 28, analyzer unit 29 and a recorder 30. Photodetector 26 preferably is a photomultiplier tube having a photocathode on which return signal 16 is incident and which converts the optical energy (photons) to electrons (current) while simultaneously amplifying the energy. The photocathode also performs the additional important function of mixing the Brillouin and Rayleigh components of signal 16 to provide a difference frequency, called the optical heterodyne frequency. The Brillouin backscatter component is frequency-shifted by the acoustic properties of the water whereas the Rayleigh backscatter component has a constant frequency and is analogous to the "local oscillator" in a superheterodyne receiver. The acoustic velocity of the water is a function of water temperature.

Figure 3:
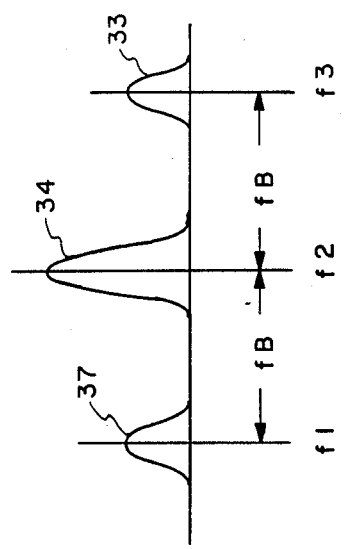
FIG. 3 is a diagram illustrating frequency products resulting from Rayleigh and Brillouin backscatter components in accordance with the practice of the invention.

Referring now to FIG. 3, the Brillouin and Rayleigh components incident on cathode 26a of photodetector 26 are represented by curves 32 and 33 at frequencies $f_1$ and $f_3$, respectively, and by curve 34 at frequency $f_2$. The signals at frequencies $f_1$ and $f_3$ are the doppler-shifted Brillouin components and the signal at $f_2$ is the frequency-unshifted Rayleigh component, the latter functioning as a "local oscillator" in an analogy to a superheterodyne receiver. The two difference frequencies $f_B$ between $f_3$ and $f_2$ and between $f_2$ and $f_1$ are the same and are additive in the baseband so that the process results in increased sensitivity. Moreover, the phase relationship of the Brillouin and Rayleigh components at photodetector 26 is correct for efficient heterodyning since both components are received from the same angle of view however wide and are produced by the same laser pulse stream.

The output (current) of photodetector 26 passes to discriminator 27, such as a delay line discriminator, which produces an analog voltage proportional to the baseband frequency $f_B$. Converter 28 changes the output of discriminator 27 into digital form for analysis in analyzer 29. Analyzer 29 receives the digital signal corresponding to the frequency $f_B$ and, using the equations below, translates it into a signal or number representative of the water temperatures. The output voltage of discriminator 27 as a function of time is directly related to water temperature as a function of depth, therefore, the sampling interval of converter 28 must be short enough to provide the desired depth analysis. The return signature can be sampled at intervals equal to the pulse duration to digitize the profile. Multiple pulses may be used to smooth the data as one would expect. By way of example, analyzer 29 may comprise a computer which compares the digital frequency input with a reference table (computed from the equations below) to derive the equivalent temperature. The output of analyzer 29 is stored in recorder 30.

Figure 5:
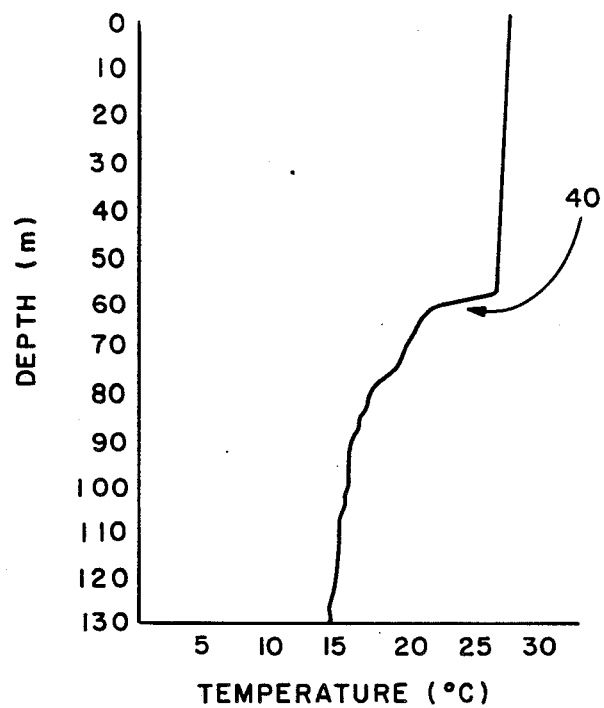
FIG. 5 is typical ocean temperature-depth curve showing the thermocline.

In typical ocean water, the vertical temperature profile, see FIG. 5, exhibits a reasonably well-defined depth where a marked gradient exists. The surface temperature changes to that of deep water at this point, indicated at 40 and is called the thermocline. As the density of water is dominated by its temperature, thermocline 40 represents the boundary layer between waters of different density.

Figure 6:
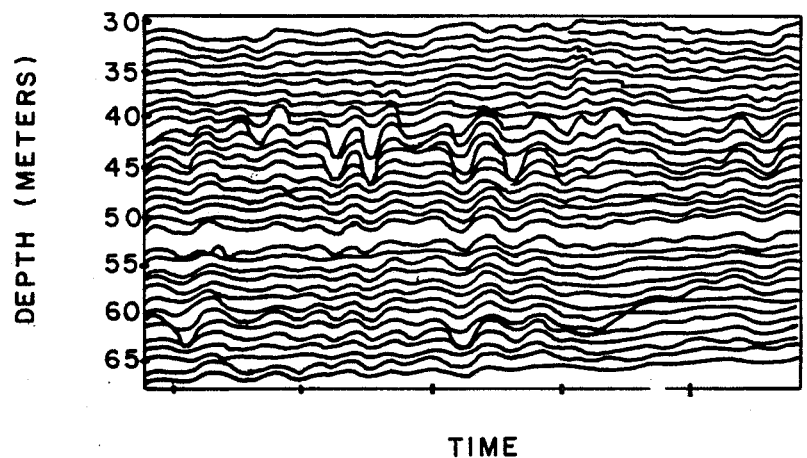
FIG. 6 is a plot of depths of constant temperature, or isotherms versus time showing internal waves.

As in all density boundaries, wave action can be supported, see "The Encyclopedia of Oceanography", supra. The existance of internal waves in the main thermocline 40 may be 20-50 feet high and are exhibited by temperature profiles such as the pattern of "isotherms," i.e., isothermal contours, shown in FIG. 6. Another such profile is a map of temperatures at constant depths. Internal wave patterns are thus mapped wherever and whenever they exist and provides a direct indication of the wake of a submarine.

Because the density gradient at thermocline 40 is relatively weak (compared to the gradient at the air-water boundary) and because of the water viscosity, the internal waves have long periods (many minutes) and persist for long times (large fractions of hours). The motion of submerged submarines near the thermocline depth generates a unique pattern of internal waves which can be identified and tracked. The wake of submerged vessels near the thermocline propogates outwardly and diminishes in amplitude much the same as the wake of a speeding surface boat. Because of the persistence of these internal waves, the pattern may be detected long after the passage of the submarine. This enhances the detectability of the submarine because only the long-persistent wake of the internal waves need be detected rather than the submarine itself. Tracking the wake in the direction of increasing wave amplitude will quickly locate the vessel o itself. The initial problem of identifing the submarine induced internal wave can be lessened through the use of automatic pattern recognition techniques of which there are many widely available.

The accuracy of temperature measurement by analysis of Brillouin backscatter may be shown mathematically. The relation of signal-to-noise ratio (SNR) to the standard deviation of frequency measurement accuracy for radar is given by $$std\ dev\ (f) = [2\ T_o(2SNR)^{-1} \qquad (1)$$

This standard deviation of the frequency also depends on a parameter $T_o$ which is usually taken to be the laser pulse width. In this case, however, the self broadening of the Brillouin shifted lines produces a Brillouin bandwidth of 480 MHz (See Hirschberg, J. G., et al., "SPEED OF SOUND AND TEMPERATURE IN THE OCEAN BY BRILLOUIN SCATTERING," Applied Optics. 23, 2624 (1984)). This requires that an effective $T_o$ of 2.1 ns be used in equation (1) rather than the laser pulse duration.

The Brillouin backscatter frequency $f_B$ is a function of the acoustic velocity $v_s$ and the laser optical frequency, $f_o$, as follows $$f_B = 2 n v_s (1/c) f_o \qquad (2)$$

where n is the index of refraction and c is the velocity of light in free space.

Differentiating equation (2) with respect to temperature yields $$df_B/dT = 2 n (1/c) f_o dv_s/dT \qquad (3)$$

The sound velocity $v_s$ is given as a function of temperature by the following expression $$v_s = 1400 + 5.02T - 0.055T^2 + 0.003T^3 \qquad (4)$$

which when differentiated with respect to temperature nd evaluated at 10° C. gives $dv_s/dT = 4.82$ m/s−° C. Substituting this value into equation (3) and using $6.54 \times 4$ Hz as the optical frequency for an assumed transmitter wavelength of 459 nm, the result obtained is $$df_B/dT = 27.95 \text{ MHz/° C.} \qquad (5)$$

Figure 4:
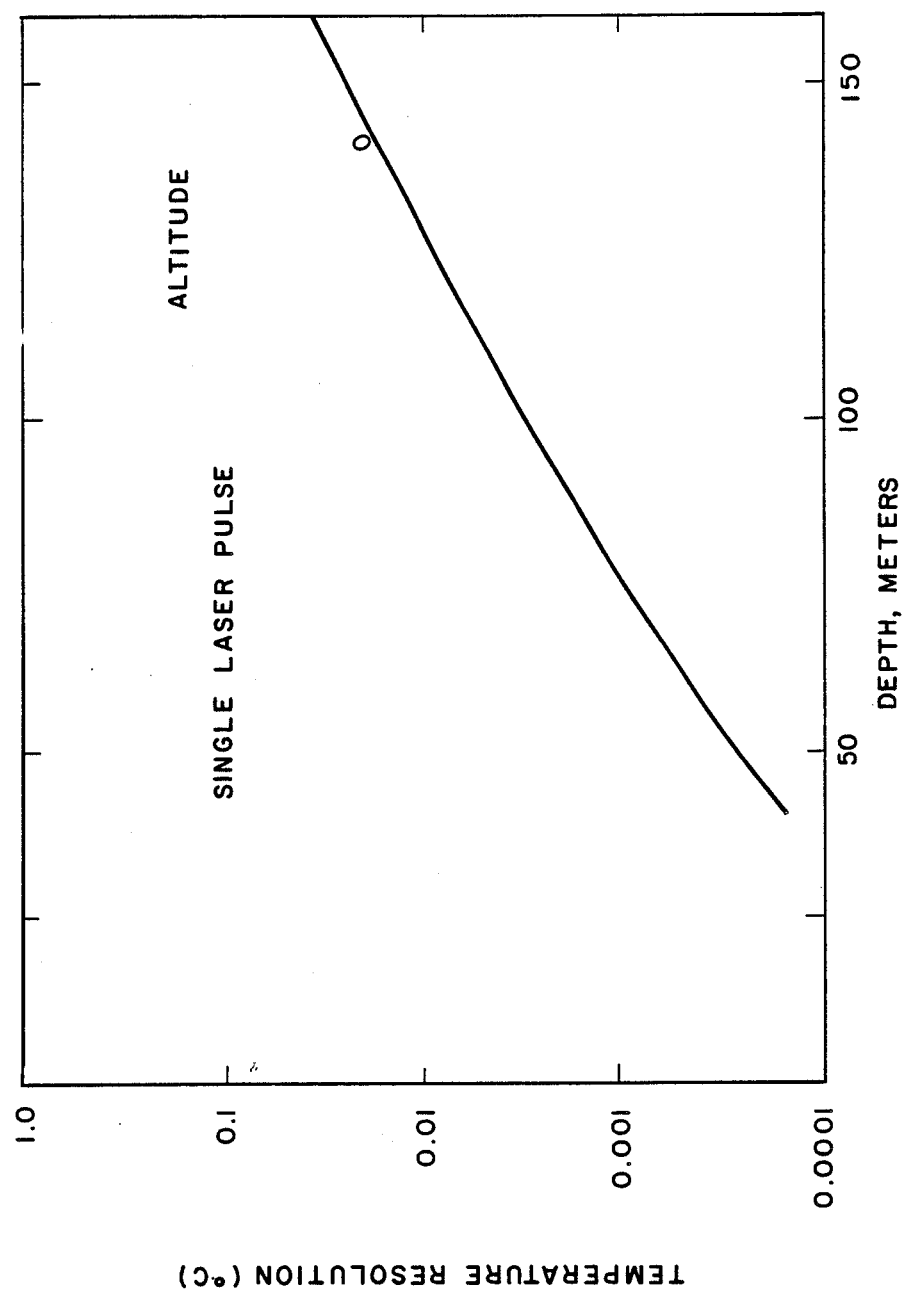
FIG. 4 is a set of curves depicting the relation of ocean temperature resolution and depth for different monitoring altitudes.

The temperature accuracy as a function of SNR can be obtained by dividing equation (1) by $df_b/dT$. The resultant temperature accuracy expressed as a function of depth for a representative system is shown in FIG. 4.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An underwater method of detecting the wake of a first submerged submarine from a second submerged submarine comprising the steps of:
   generating from within said second submarine a pulsed laser beam;
   directing said beam upwardly from said second submarine with an intensity sufficient to penetrate the thermocline of said water;
   detecting in said second submarine the Rayleigh and Brillouin backscatter light components produced by the interaction of said beam with said water;
   mixing said Rayleigh and Brillouin light components and thereby producing a heterodyne signal having a frequency $f_B$;
   periodically converting the heterodyne signal into a temperature/depth profile; and
   translating said temperature/depth profile into spatial patterns for comparison with patterns characteristic of the wake of a moving submarine.

2. The method according to claim 1 in which said spatial patterns constitute isothermal contours.

3. The method according to claim 1 in which said spatial patterns constitute water temperature at constant depths.

4. The method according to claim 1 in which said body of water constitutes an ocean.

5. The method according to claim 1 in which said body of water constitutes any body of water navigable by a submarine.

6. The method of claim 5 including the step of periodically repeating the first six steps by traversing said beam in a plane othogonal to the direction of travel of said second submarine, thereby sweeping across an area of said thermocline.

7. The method according to claim 6 in which said laser beam is traversed over an arc $< \pm 40°$.

8. The method according to claim 6 in which said laser beam is is in the blue-green region of light.

9. An underwater method of detecting the wake of a first submerged submarine from a second submerged submarine comprising the steps of:
   generating from within said second submarine a pulsed laser beam;
   directing said beam downwardly from said second submarine with an intensity sufficient to penetrate the thermocline of said water;
   detecting in said second submarine the Rayleigh and Brillouin backscatter light components produced by the interaction of said beam with said water;
   mixing said Rayleigh and Brillouin light components and thereby producing a heterodyne signal having a frequency $f_B$;
   periodically converting the heterodyne signal into a temperature/ depth profile; and
   translating said temperature/depth profile into spatial patterns for comparison with patterns characteristic of the wake of a moving submarine.

10. The method according to claim 9 in which said spatial patterns constitute isothermal contours.

11. The method according to claim 9 in which said spatial patterns constitute water temperature at constant depths.

12. The method according to claim 10 in which said body of water constitutes an ocean.

13. The method according to claim 9 in which said body of water constitutes any body of water navigable by a submarine.

14. The method of claim 13 including the step of periodically repeating the first six steps by traversing said beam in a plane othogonal to the direction of travel of said second submarine, thereby sweeping across an area of said thermocline.

15. The method according to claim 14 in which said laser beam is traversed over an arc $< \pm 45°$.

16. The method according to claim 15 in which said laser beam is is in the blue-green region of light.

17. An underwater search method for detecting a first submerged submarine from a second submerged submarine, said search method comprising the steps of:
   generating from within said second submarine a pulsed laser beam having an intensity sufficient to penetrate the thermocline of said water;
   directing said beam from said second submarine into said water in a direction toward said thermocline;

detecting in said second submarine the Rayleigh and Brillouin backscatter light components produced by the interaction of said beam with said water;

mixing said Rayleigh and Brillouin light components and thereby producing a heterodyne signal having a frequency $f_B$;

periodically converting the heterodyne signal into a temperature/depth profile;

translating said temperature/depth profile into spatial patterns periodically repeating the above steps by traversing said beam in a plane othogonal to the direction of travel of said second submarine thereby creating a library of spatial profiles;

comparing said library of spatial profiles with spatial patterns characteristic of the wake of a moving submarine; and, tracing said wake to determine the location of the first submarine.

18. The method according to claim 17 in which said tracing step is performed by determining the direction of increasing pattern amplitudes.

19. The method according to claim 18 in which said spatial patterns constitute water temperature at constant depths.

20. The method according to claim 18 in which said body of water constitutes an ocean.

21. The method according to claim 17 in which said spatial patterns constitute isothermal contours.

22. The method according to claim 21 in which said body of water constitutes any body of water navigable by a submarine.

23. The method according to claim 21 in which said laser beam is traversed over an arc $< \pm 45°$.

* * * * *